United States Patent [19]

Benages

[11] 4,260,302

[45] Apr. 7, 1981

[54] TRANSFER MACHINES

[76] Inventor: Jorge G. Benages, Calle Balmes, 221, Barcelona 6, Spain

[21] Appl. No.: 66,168

[22] Filed: Aug. 13, 1979

[30] Foreign Application Priority Data

Aug. 21, 1978 [ES] Spain .................................. 472.707

[51] Int. Cl.$^3$ ............................................. B23B 39/16
[52] U.S. Cl. .................................................. 408/118
[58] Field of Search ........................................ 408/118

[56] References Cited

U.S. PATENT DOCUMENTS

| | | | |
|---|---|---|---|
| 132,396 | 10/1872 | Gunn | 408/118 |
| 512,542 | 1/1894 | Forbes | 408/118 |
| 1,677,238 | 7/1928 | Kinney | 408/118 |
| 1,835,551 | 10/1931 | Wright | 408/118 |
| 2,995,069 | 8/1961 | Wahlstrom | 408/118 |

Primary Examiner—Harrison L. Hinson
Attorney, Agent, or Firm—Steinberg & Raskin

[57] ABSTRACT

A machine tool for performing a plurality of operations on a workpiece, i.e. a transfer machine, has two tools which are alternatively presentable to the workpiece and which are mounted coaxially for common rotation on the front end of a spindle. The spindle is rotatably mounted in a sleeve which is mounted for axial displacement in a fixed head. The displacement of the sleeve, which may be effected by a rack and pinion, serves to feed a first one of the tools to effect its machining operation. A front portion of the sleeve projects beyond the head and carries an actuator for causing the second tool to move axially relative to the first. After machining by the first tool, operation of the acutator serves to initiate displacement of the second tool to commence its machining operation. To provide a common rotary drive for both tools, the spindle or a prolongation thereof extends rearwardly of the head and is splined to a drive pulley mounted in an axially fixed position on the rear of the head.

10 Claims, 7 Drawing Figures

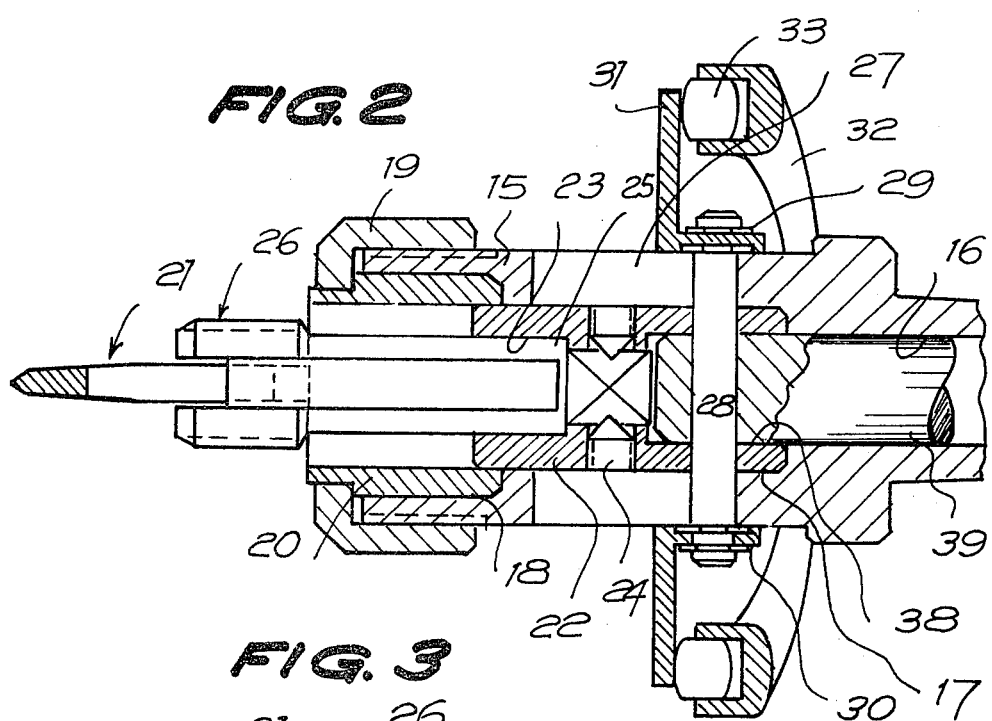
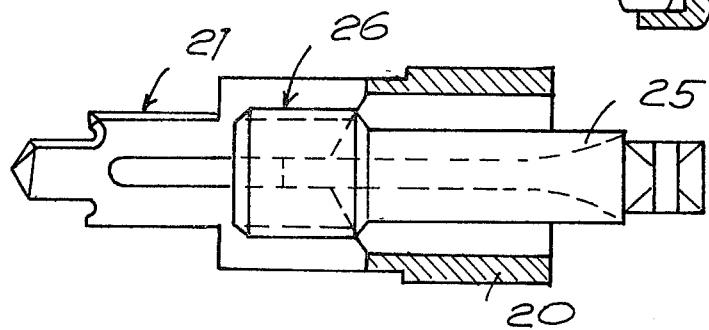
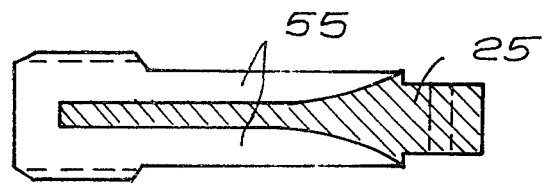

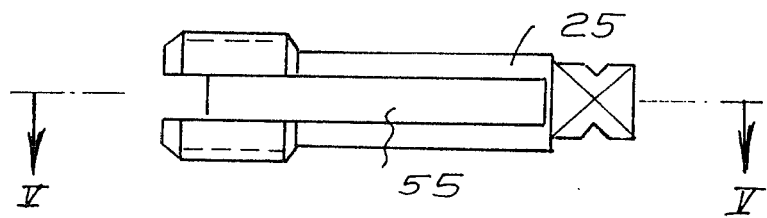
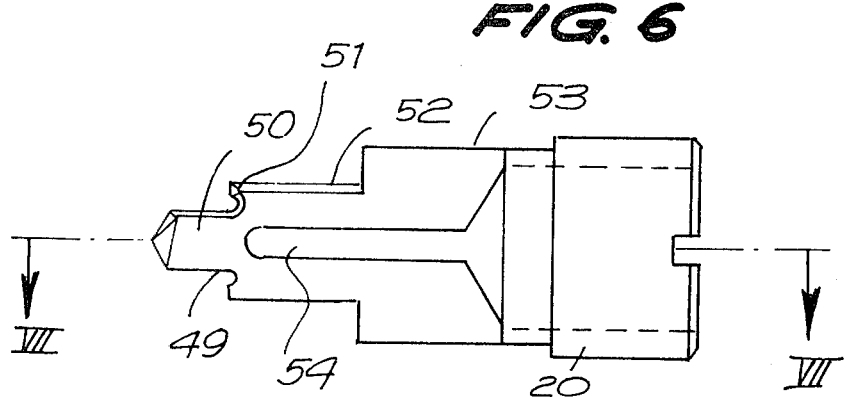
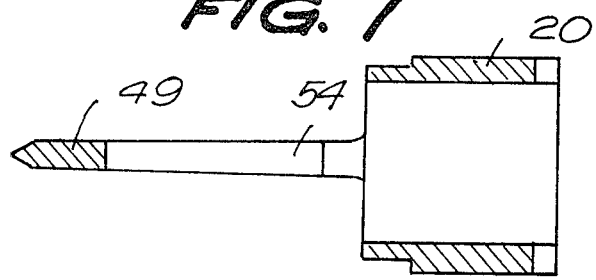

TRANSFER MACHINES

FIELD OF THE INVENTION (i) Background of the Invention

The invention relates to transfer machines, i.e. machine tools in which separate tools or groups of tools are employed to carry out successive machining operations on a workpiece. The invention is concerned with mechanisms operating toolholders in such machines, by means of which two separate tools can be displaced relative to each other and can be fed successively to effect different machining operations.

(ii) Description of the Prior Art

In known machines of this kind one of the tools for groups of tools is mounted on a conventional spindle adapted to rotate in a head which moves linearly on slides. The head has to carry not only the actual drive means but also the drive means for advancing and feeding the other tool or group of tools.

Apart from the fact that the construction of a large head slidable on slides is expensive, when it has to be equipped with the drive means for a second group of tools its size tends in practice to become prohibitive in the majority of cases.

SUMMARY OF THE INVENTION

Broadly, the present invention has for an object to overcome this disadvantage by providing a machine in which a spindle carrying a multiple toolholder is mounted for rotation in a spindle-carrier sleeve, which in turn is mounted for axial displacement in a fixed head carrying the drive means for the linear feed of one of the tools or groups of tools, the working end of the spindle-carrier sleeve projecting from the head and carrying means for at least initiating the feed movement of the second tool or group of tools; while to provide a rotary drive for both tools or sets of tools, the spindle or a prolongation thereof projects from the opposite end of the head and is coupled rotationally to a drive pulley mounted for rotation but axially fixed on the aforesaid head.

Since the means for initiating the displacement of the second tool assembly are carried by the spindle-carrier sleeve itself, the displacement necessary for this initiation can be very slight, so that the means producing the displacement can be small and can be installed without difficulty in the front part of the arrangement.

According to the invention there is provided a machine tool for successively performing a plurality of operations on a workpiece, said machine comprising:

a fixed machine head;

a spindle carrier sleeve slidably mounted in said head for movement in an axial direction, the sleeve having a working end projecting from the head;

a spindle rotatably mounted within the sleeve, and constrained against axial movement relative to the sleeve;

a toolholder fitted to the spindle so as to be fast therewith, the toolholder carrying first and second tool means outwardly of the working end of the sleeve, for the tool means each to rotate with the spindle and at least the first tool means to be axially moveable relative to the machine head by axial movement of the spindle carrier sleeve and hence of the spindle, the first and second tool means being displaceable relative to one another in the said axial direction;

first displacement means for effecting axial movement of the sleeve relative to the head and thereby axially feeding the first tool means;

second displacement means for at least initiating relative displacement of the first and second tool means, the second displacement means being mounted on the said projecting working end of the sleeve; and, the head further carrying a pulley or other drive wheel means for transmitting drive to the spindle, said wheel means being rotatably mounted outwardly of the end of the sleeve remote from the tool means, rotationally coupled to the spindle to effect rotation thereof and constrained against axial movement relative to the head.

Each of the tool means can be a single tool or a group of tools. Suitably the spindle or a prolongation thereof is axially slidable through the drive pulley or other drive wheel means.

It is advantageous for the axial displacement of the spindle-carrier sleeve to be effected with the aid of a rack fast with the sleeve and a pinion rotatably mounted on the head in engagement with the rack. This can be driven by motor means situated at the side of, or within, the head, thus achieving a further reduction of the space required.

In a preferred embodiment, the first tool means is fast with the toolholder and comprises a cutting end, a shank fixed to the toolholder, and a central body part intermediate said cutting end and shank; this central body part defining an axial slideway for guiding displacement of the second tool means relative to the first tool means. Preferably said toolholder is tubular, with a plurality of axially extending windows therein and said shank of the first tool means is also tubular, the machine tool further comprising a follower collar for the second displacement means, which collar is slidably mounted on the exterior of the toolholder and a member axially slidable within the interior of the toolholder and said tubular shank of the first tool means, the second tool means being fast with this member, and this member comprising a crosshead having arms projecting radially through the windows in the toolholder and connected to said collar, the second displacement means being operative to displace this collar axially of the toolholder.

Preferably the spindle is tubular and the said member slidable within the toolholder is extended by a rod which projects from the spindle, and outwardly from the end of the sleeve remote from the tools, the drive wheel means being axially slidably mounted on this rod but constrained to rotate therewith.

BRIEF DESCRIPTION OF THE DRAWINGS

FIG. 2 is an enlargement of the section of this assembly as shown in FIG. 1, but turned through 90° with respect to the rest of the mechanism;

FIG. 3 is a partial axial section of the two tools shown in FIG. 2, in a plane at right angles to the plane of that Figure;

FIG. 4 is an elevation of a thread-cutting tool which forms part of the assembly shown in the preceding Figure;

FIG. 5 is a section on the line V—V in the preceding Figure;

FIG. 6 is a plan view of a profiled cutter which forms part of the assembly shown in FIG. 3, and FIG. 7 is a section along the line VII—VII in the preceding Figure.

DESCRIPTION OF THE PREFERRED EMBODIMENT

Figure 1:
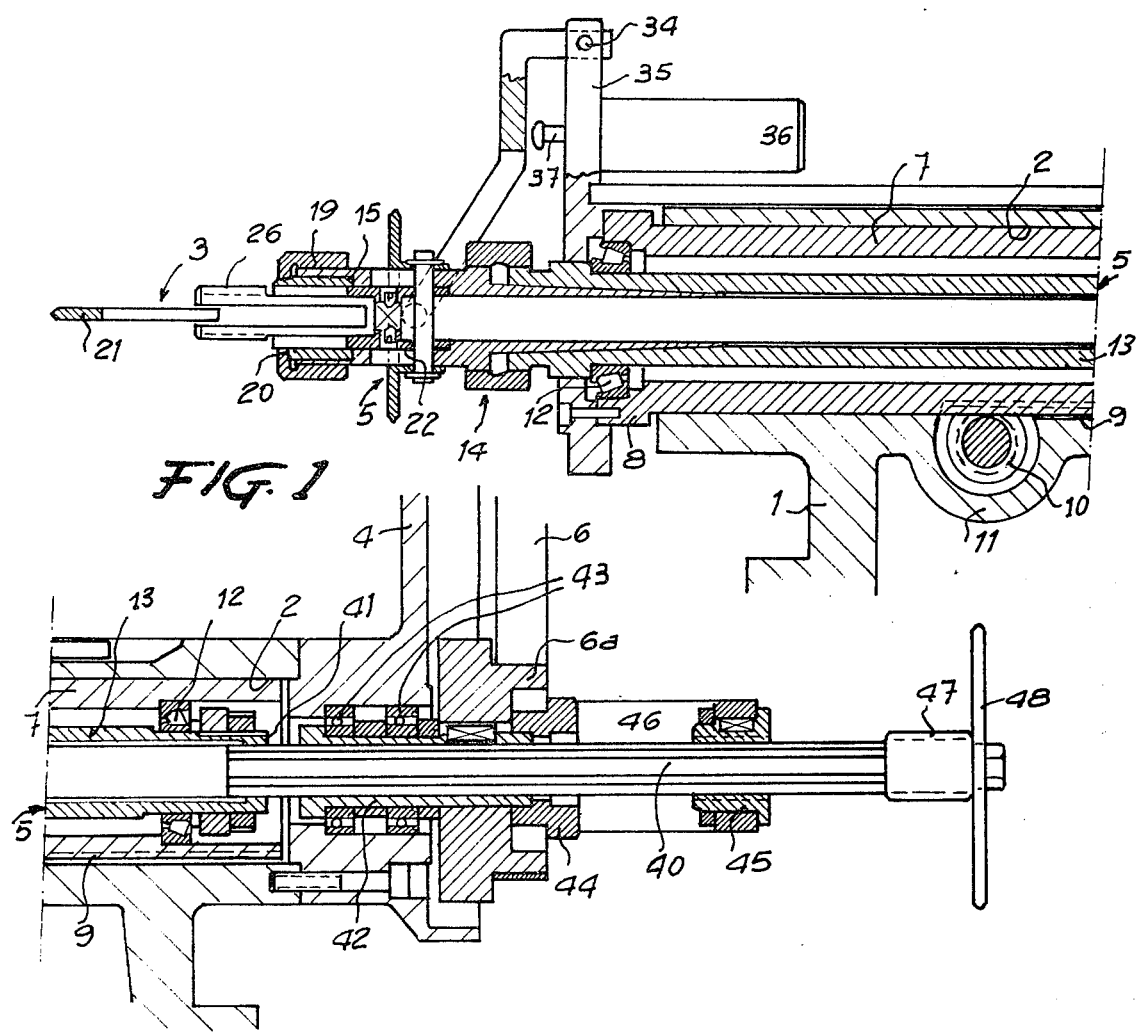
FIG. 1 is a vertical axial section of a toolholder drive mechanism embodying the present invention.

As shown in FIGS. 1 and 2, the embodiment includes a fixed head 1 which can be mounted in any conventional manner on the corresponding fixed parts of a machine, and in whose upper region is formed a cylindrical chamber 2 whose axis coincides with the direction of the linear feed movement of tools indicated by the general reference 3. The rear end of the head, opposite to that where the said tools are located, carries a fixed support 4 which extends rearwards away from the axis to support a drive motor (not shown) for the work spindle, indicated by the general reference 5, which motor is coupled to the spindle with the aid of a flat belt 6 coupled to the drive pulley 6a.

Inside the chamber 2 a spindle-carrier sleeve 7 is mounted for free axial sliding. Its front or working end, i.e. the end nearest the work zone, projects from the fixed head and terminates in a head 8. The sleeve 7 has in a bottom portion a rack 9 which meshes with a drive pinion 10 accommodated in a casing 11 of the fixed head 1. The pinion 10 is adapted to be driven by conventional means situated, for example, behind the plane of the drawing.

The two ends of the spindle-carrier sleeve 7 each carry conical roller bearings 12 by means of which a tubular spindle 13 is mounted for free rotation within the sleeve 7. The front end of the spindle 13 is formed to receive a toolholder, for example by means of a suitable morse taper coupling as shown generally at 14.

The toolholder is composed of a generally cylindrical element having an axial bore 16. The front portion of the toolholder is a toolholder body 15 within which the bore 16 widens stepwise to form two regions 7 and 18 of successively larger respective diameters. Within the end region 18 (of largest diameter) there is fixed, by means of a cap nut 19 a tubular shank 20 which forms part of a first tool, given the general reference 21, which will be described later on. The internal diameter of this shank is identical to the diameter 17, with which it forms a slide guide for a displaceable cylindrical member 22. The front end of this member 22 has a stepped cylindrical seat 23 in which is received and fixed by means of set-screws 24 the complementary stem 25 of a second tool, which is given the general reference 26 and which will be described in detail in due course. It is convenient for the stem 25 to have a narrower rear portion which is facetted (see FIGS. 2 to 4) in order to achieve more rigid torsional coupling.

As can be seen in FIG. 2, the rear end of the displaceable member 22 has an axial bore 38 to receive the complementary end of a rod 39, which extends through the entire length of the tubular spindle 13, and can slide axially within it.

The body 15 of the toolholder has two diametrically opposite axially elongate windows 27. A crosshead rod 28 passes diametrically through the displaceable member 22 in a rearward region thereof. The crosshead rod 28 also passes through a bore in the end of the rod 39 which is located in the axial bore 38 of the member 22. Thus the rod 39 and the member 22 are locked together.

The ends of the rod 28 pass through the windows 27 in the toolholder body 15, and project outside the body 15, where they are fastened, for example by means of circlips 29 to a sleeve 30, which has at one axial end a radial flange providing a collar 31. This is arranged to be borne upon by thrust rollers 33 on a drive fork 32 which is articulated at 34 on a support 35, fixed to the head 8 of the spindle-carrier sleeve. The support 35 carries an actuator 36 which comprises a pneumatic drive cylinder and a rod 37, and on operation acts to displace the drive fork 32, the collar 31 and hence the displaceable member 22 and associated parts towards the left in FIG. 1.

The rod 39 has a splined tail 40 which projects from the rear ends of the head 1 and sleeve 7 and is coupled for rotation on the one hand to a complementary coupling 41 provided at the rear end of the spindle 13 and on the other hand to an internally splined sleeve 42 which is rotatably mounted within the support 4 by means of ball bearings 43. On the free, rearward end of the sleeve 42 the pulley 6a is fixed by means of a nut 44.

The splined tail 40 passes loosely through a sleeve 45 which has standard internal thread and is mounted in a readily exchangeable manner on a support 46. This support 46 is fixed by conventional means (not illustrated) to the support 4. The free end of the tail has fastened to it a member 47 having a standard external thread, and also carries a plate 48 for operating contacts associated with the control circuits of the machine. When displacement of the rod 39 to the left causes engagement of the threads on the sleeve 45 and the member 47, continued rotation of the rod 39 causes it to be advanced leftward in a manner determined by the threads. At the end of this controlled advance, the trip plate 48 operates an end-of-stroke drive stop associated with automatic control circuits of the machine. These parts are not described in greater detail because they are sufficiently well known.

The arrangement is such that the mechanism when at rest is held in the position shown in the drawings, but the actuator 36 can displace the member 22 with its associated elements 20 so that the threaded member 47 engages the sleeve 45 in order subsequently to advance the tool 26 in accordance with the standard screwthread provided on the said elements 45 and 47. This is appropriate when, as in this embodiment, tool 26 is a thread-cutter.

The tools used in the present embodiment will now be described with reference to FIGS. 3 to 7. FIG. 3 shows in partial section the assembly formed of the two tools in their operating position. The tool 21 (FIGS. 6 and 7) has a generally flat body 49 extending substantially in an axial plane of the tubular shank 20. The particular tool illustrated is profiled for machining the interior parts of a cock or valve body, being constructed to machine the bore with the part 50, the seat with the profile 51, the casing with the profile 52, and the mouth of the mounting with the profile 53. Of course, a tool 21 suitable for another series of operations could be substituted for the one illustrated.

The tool 26 is intended for cutting a thread in the bore cut by the part 50 of the tool 21. The tool 21 has an axial slot 54 and the tool 26 has two diametrically opposed axially extending grooves 55, with a web therebetween in such a manner that the tools can interpenetrate, the web of tool 26 passing through the slot 54 of tool 21, so that the tool 26 can slide to the left from the position shown in FIGS. 1 to 8.

The functioning of the mechanisms and members described will be apparent from the drawings and from the description given above. Drive means act on the pinion 10 to displace the spindle-carrier sleeve 7, together with all the elements associated with it, to the left in the Figures until the tool 21, which is fixed axially in relation to the said spindle-carrier sleeve, completes its leftward movement during which it machines the workpiece (not shown in the drawing). When the spindle-carrier sleeve is in its fully advanced (to the left) position, energisation of the actuator 36 causes engagement of the body 47 with the threaded sleeve 45, so that the tool 26 is caused to penetrate into the workpiece to form a screwthread on the mouth of a casing thereof by means of the cutters 52. The type of thread can be varied by changing the elements 45, 47 bearing the standard thread.

Since at the end of the first phase of the operation the body 47 can remain as close as necessary to the threaded sleeve 45, the movement required for initiation of advance of the tool 26 can be extremely short, so that the actuator 36 can be of very small dimensions and consume a practically negligible amount of energy. The support 46 can be made longitudinally adjustable in its means of fastening to the support 4, in order to permit adjustment of the length of initiation movement in each case.

The system provided by the invention lends itself to various modifications which can readily be appreciated from the description given above. Thus, the displaceable member 22 can, if the arrangement is suitably dimensioned, be provided with one or more tools for machining external parts of the workpiece.

Another advantage of the system of the invention consists in that the arrangement of the displaceable member 22 makes it possible to use as the tool 26 screwcutting taps of types readily available on the market. Such parts are relatively inexpensive to produce, can be easily and rapidly replaced, and can be produced to connect with the shank of any type of commercial tool or special purpose tool.

The assembly may include various conventional elements and construction details, for example an angular positioning device for the spindle-carrier sleeve 7, such as a key 56 fastened to the support 25 parallel to the working axis of the assembly and slidable in a keyway 57 formed in the top portion of the fixed head 1. Moreover, other elements, which have not been described in detail, can easily be identified in the drawings.

I claim:

1. A machine tool for successively performing a plurality of machining operations on a workpiece, said machine tool comprising:
   a fixed machine head;
   a spindle carrier sleeve slidably mounted in said head for movement in an axial direction, said sleeve having first and second opposite ends, said first end projecting from said head;
   a spindle rotatably mounted within said sleeve, said spindle being constrained against axial movement relative to the sleeve;
   a toolholder fitted to said spindle so as to be fast therewith,
   said toolholder carrying first and second tool means outwardly of said first end of said sleeve, for said tool means each to rotate with said spindle and at least said first tool means to be axially moveable relative to the machine head by axial movement of said spindle carrier sleeve and hence of said spindle, said first and second tool means being displaceable relative to one another in said axial direction;
   first displacement means for effecting axial movement of said sleeve relative to said head and thereby axially feeding said first tool means;
   second displacement means for at least initiating relative displacement of said first and second tool means, said second displacement means being mounted on said projecting first end of said sleeve;
   said head further carrying drive wheel means for transmitting drive to said spindle, said wheel means being rotatably mounted outwardly of said second end of said sleeve, rotationally coupled to said spindle to effect rotation thereof and constrained against axial movement relative to said head; and
   means for rotatably driving said drive wheel means.

2. A machine tool according to claim 1 wherein said first displacement means comprises a rack fast with said sleeve, a pinion rotatably mounted on said head in engagement with said rack, and drive means for said pinion.

3. A machine tool according to claim 1 wherein the first tool means is fast with the toolholder, one of said tool means having an axial slot and the other said tool means having a diametrically extending element passing through said slot and axially slidable within it whereby said second tool means is coaxially slidable on said first tool means during said relative displacement of said tool means.

4. A machine tool according to claim 1 wherein said first tool means is fast with said toolholder and comprises a cutting end, a shank fixed to said toolholder, and a central body part intermediate said cutting end and shank, said central body part defining an axial slideway for guiding displacement of said second tool means relative to said first tool means.

5. A machine tool according to claim 4 wherein said toolholder is tubular, with a plurality of axially extending windows therein and said shank of said first tool means is also tubular; said machine tool further comprising a collar axially slidably mounted on the exterior of said toolholder and a member axially slidable within the interior of said toolholder and said tubular shank of said first tool means, said second tool means being fast with said member, and said member comprising a crosshead having arms projecting radially through said windows in said tool holder and connected to said collar, said second displacement means being operative to displace said collar axially of said toolholder to at least initiate relative displacement of said first and second tool means.

6. A machine tool according to claim 5 wherein said second displacement means comprises a fork extending at opposite sides of said toolholder, and an actuator operative to urge said fork against said collar thereby to displace said collar.

7. A machine tool according to claim 6 wherein said actuator comprises a fluid pressure operable cylinder and piston assembly.

8. A machine tool according to claim 5 wherein said spindle is tubular and said member slideable within said toolholder comprises a rod which projects from said spindle, and outwardly from said second end of said sleeve, said drive wheel means being axially slidably mounted on said rod but constrained to rotate therewith.

9. A machine tool according to claim 8 further comprising a portion fast with said head and surrounding said rod, which portion is provided with an internal standard screwthread, said rod comprising a portion with an external standard screwthread to engage said internal thread after initiation of relative displacement by said second displacement means, said rod also having fitted thereto end-of-stroke trip means for operating automatic control means of the machine tool at the end of the stroke of said second tool means.

10. A machine tool according to claim 1 wherein said first tool means has cutting surfaces adapted to machine a bore and said second tool means is adapted to cut a thread in said bore machined by said first tool means.

* * * * *